T. N. SHERWOOD.
Wheel Cultivator.
No. 52,213.  Patented Jan. 23, 1866.
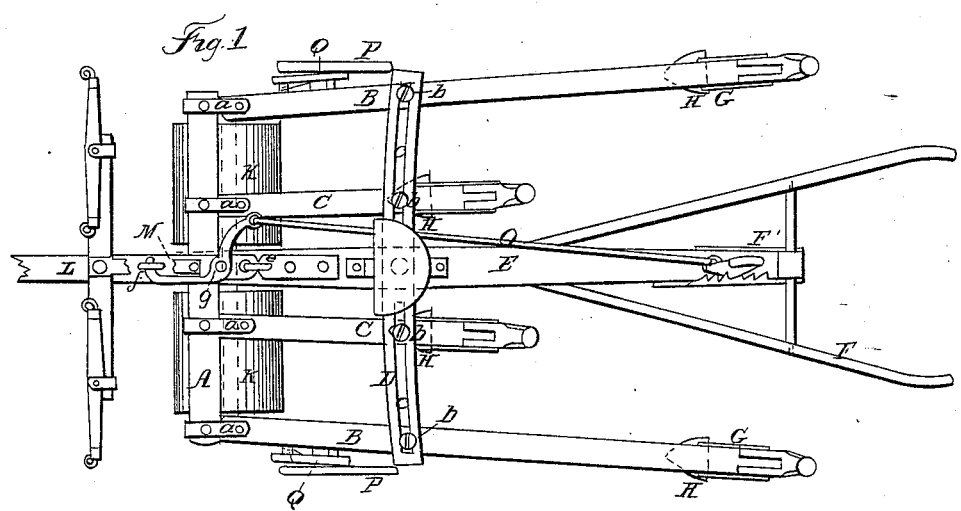
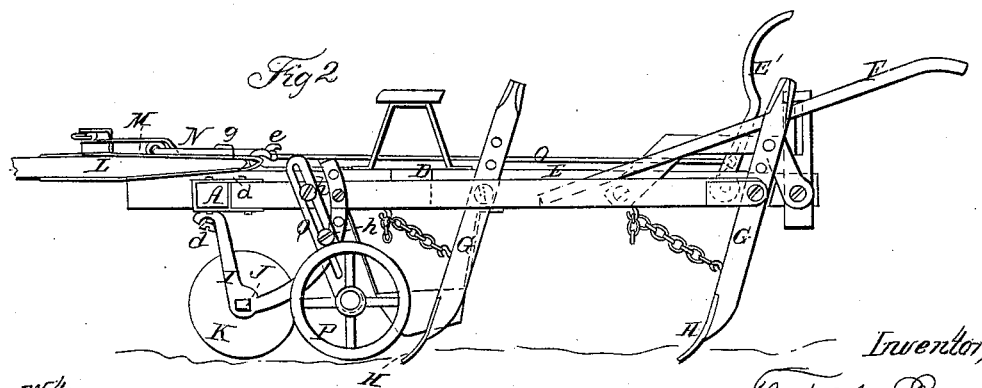

UNITED STATES PATENT OFFICE.

THOMAS N. SHERWOOD, OF DUNLAPSVILLE, INDIANA.

IMPROVEMENT IN CULTIVATORS.

Specification forming part of Letters Patent No. 52,213, dated January 23, 1866.

*To all whom it may concern:*

Be it known that I, THOMAS M. SHERWOOD, of Dunlapsville, in the county of Union and State of Indiana, have invented a new and Improved Cultivator; and I do hereby declare that the following is a full, clear, and exact description thereof, which will enable those skilled in the art to make use the same, reference being had to the accompanying drawings, forming part of this specification, in which—

Figure 1 is a plan or top view of my invention; Fig. 2, a side view of the same.

Similar letters of reference indicate corresponding parts.

This invention relates to a new and improved cultivator for plowing corn and other crops which are grown in hills or drills, and also for plowing in wheat and other grain between rows of corn, and for rolling or compacting the earth around corn or other crops under cultivation.

The invention consists in a novel arrangement of the parts, as herein fully shown and described, whereby the device may be very readily manipulated and the work performed in a perfect manner.

A represents the front beam or cross-bar of the device, to which four plow-beams, B B C C, are attached by joints $a$, which joints admit of a lateral movement or adjustment of the beams, as will be fully understood by referring to Fig. 1. These plow-beams are secured at any desired distance apart within the scope of their movement or adjustment by means of set-screws $b$, which pass through curved slots $c$ in a cross-bar, D, secured to a bar, E, which is attached centrally, permanently, and at right angles to the beam or cross-bar A, and has handles F F at its rear part. The plow-beams B B C C have standards G attached to their rear ends, to which standards the plows H are secured.

To the ends of the front beam, A, there are attached, by pivots $d$, curved bars I I, the rear parts of said bars being secured to the beams B B. The lower parts of the bars I I serve as bearings for a shaft, J, on which two rollers, K K, are placed and allowed to turn freely.

L represents the draft-pole of the device, the rear end of which is fitted on a hook, $e$, on the front part of the bar E, and said bar has an upright staple, M, in it near its front end, said staple passing through a slot or mortise, $f$, in the draft-pole.

On the rear part of the draft-pole there is secured, by a fulcrum-pin, $g$, a lever, N, the front end of which is bent or curved, so that it may pass through the staple M and secure the draft-pole down on bar E and form a rigid attachment of the former to the latter. The rear end of this lever N is connected to a rod, O, which extends back to the rear of the bar E and is attached to a lever, E', which is within convenient reach of the attendant or driver who has hold of the handles F F.

From the above description it will be seen that the plows may be adjusted at a greater or less distance apart as occasion may require, and at anytime, if be necessary to loosen the tongue from the bar E in order to admit of the device being raised at the rear in order to clear an obstruction or for other purposes, the driver simply throws forward the upper end of the lever E' and the lever N is moved out from the staple M, which leaves the device free to be manipulated independently of the draft-pole.

In cases where the rollers K are not required they may be detached and wheels P used in their stead, said wheels being secured to the lower ends of bars Q, which are slotted longitudinally, and are secured to the bars I by screws $h$, which pass into the bars I and beams B.

The device, when used as an ordinary cultivator, has all the parts above described attached—the rollers being used when it is desired to roll or compact the earth at the sides of the rows of plants, said rollers when not required being removed and the wheels P substituted therefor.

In plowing in grain the tongue or draft-pole may be removed and a single horse attached to the device.

Having thus described my invention, I claim as new and desire to secure by Letters Patent:

1. The lever N, placed on the rear part of the draft-pole L and connected, by a rod, O, to a lever, E', at the rear of the bar E, in combination with a staple, M, attached to bar E and passing through the draft-pole to receive the front end of lever N, and the connecting of the rear end of the draft-pole to the bar E by a hook, e, substantially as and for the purpose herein set forth.

2. The rollers K K, when applied to the device in front of the plows, substantially as and for the purpose set forth.

3. The combination of the adjustable plow-beams B B C C, rollers K K, wheels P P, and draft-pole L, all arranged to operate in the manner substantially as and for the purpose set forth.

THOMAS N. SHERWOOD.

Witnesses:
J. M. STANTON,
A. B. STANTON.